US010457421B2

(12) United States Patent
O'Toole

(10) Patent No.: US 10,457,421 B2
(45) Date of Patent: Oct. 29, 2019

(54) DRONE DOCKING STATION AND DELIVERY SYSTEM

(71) Applicant: Daniel S O'Toole, Carmel, IN (US)

(72) Inventor: Daniel S O'Toole, Carmel, IN (US)

(*) Notice: Subject to any disclaimer, the term of this patent is extended or adjusted under 35 U.S.C. 154(b) by 288 days.

(21) Appl. No.: 15/328,027

(22) PCT Filed: Nov. 21, 2015

(86) PCT No.: PCT/US2015/062034
§ 371 (c)(1),
(2) Date: Jan. 21, 2017

(87) PCT Pub. No.: WO2016/094067
PCT Pub. Date: Jun. 16, 2016

(65) Prior Publication Data
US 2017/0203857 A1  Jul. 20, 2017

Related U.S. Application Data

(63) Continuation of application No. 14/565,418, filed on Dec. 9, 2014, now Pat. No. 9,840,340.

(51) Int. Cl.
*B64F 1/32* (2006.01)
*A47G 29/122* (2006.01)
(Continued)

(52) U.S. Cl.
CPC .............. *B64F 1/32* (2013.01); *A47G 29/122* (2013.01); *A47G 29/141* (2013.01); *B60L 53/60* (2019.02);
(Continued)

(58) Field of Classification Search
CPC .. B64F 1/32; B64F 1/005; B60L 53/60; B60L 53/80; B64C 39/024; B64D 1/12
See application file for complete search history.

(56) References Cited

U.S. PATENT DOCUMENTS

| 1,616,269 | A | * | 2/1927 | Lodge | ............... G09F 13/04 |
| | | | | | 40/566 |
| 3,593,914 | A | * | 7/1971 | Van Orden | ........ A47G 29/1212 |
| | | | | | 232/17 |

(Continued)

FOREIGN PATENT DOCUMENTS

| DE | 202014000236 | * | 2/2014 | |
| WO | WO-2013/169114 | * | 11/2013 | |
| WO | WO-2014182636 A1 | * | 11/2014 | ............ B65D 43/16 |

*Primary Examiner* — Justin M Benedik
(74) *Attorney, Agent, or Firm* — Ritchison Law Offices, PC; John D Ritchison

(57) ABSTRACT

Disclosed herein is a system and device for a drone docking station for deposit of items delivered by drone. Items may include but not be limited to food items, groceries and parcels. A secure porch, roof, window or otherwise building mounted box may be secured through to an existing edifice or may be configured to mount to an existing mailbox post and actually take the place of the mailbox. The basic elements making of components of the box enable it to carry out one efficient and secure delivery of goods to a container box located at a specific address, and to securely hold those good until they are picked up regardless of duration, weather, or otherwise. The drone dock may employ many different technological devices in order to provide for communication between the drone dock and a drone, security, and preservation of the delivered goods before during and after delivery.

21 Claims, 9 Drawing Sheets

Figure 3:
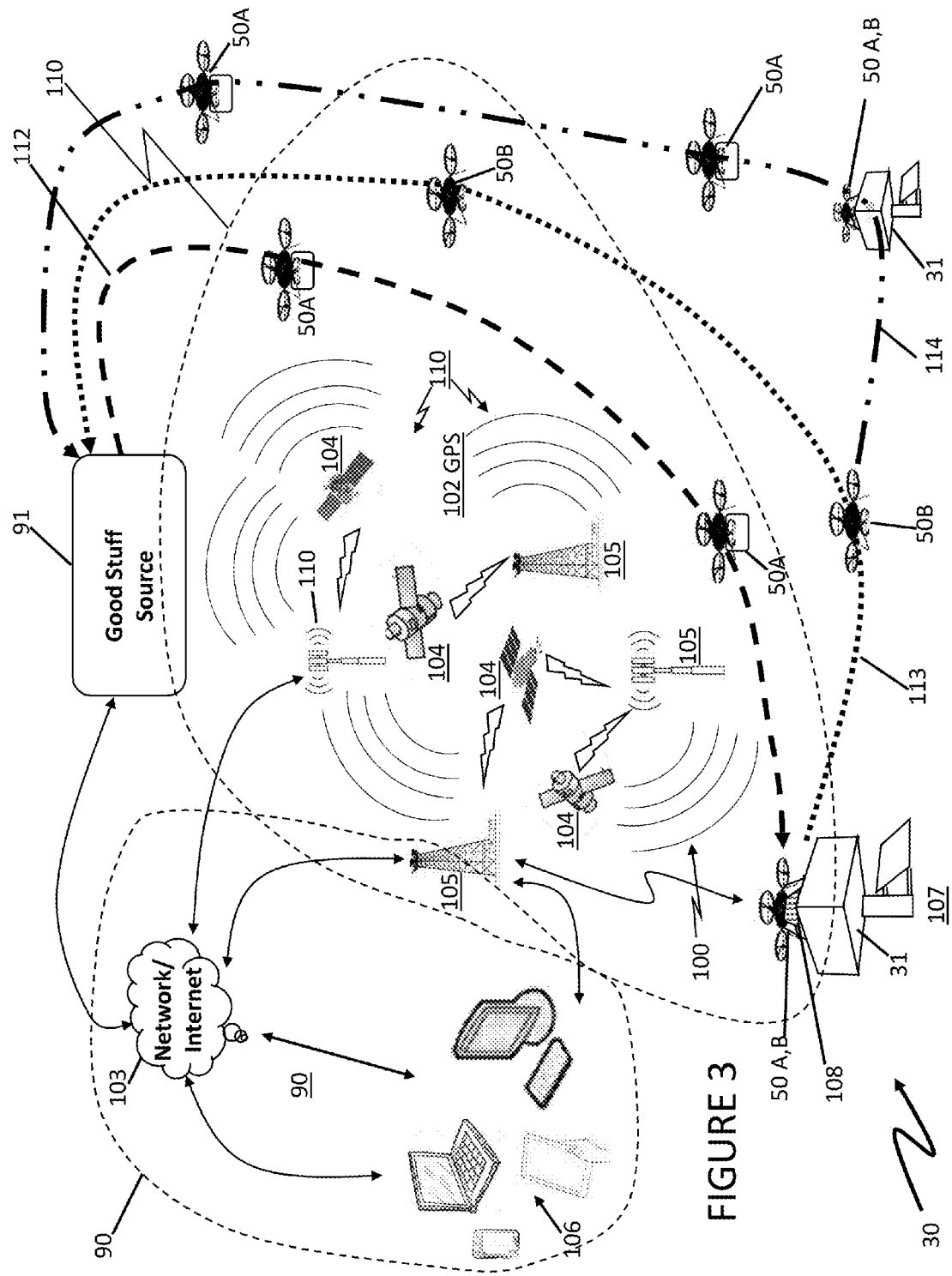
Figure 3:
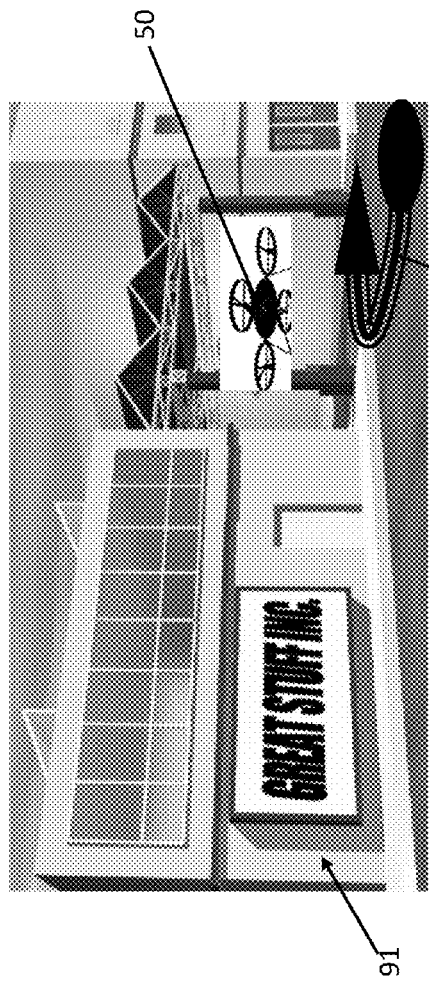
Figure 3:
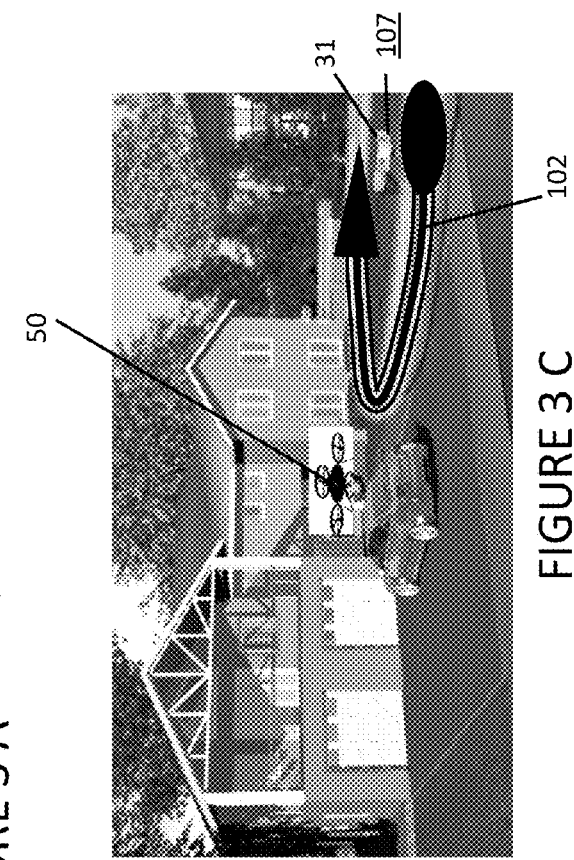
Figure 3:
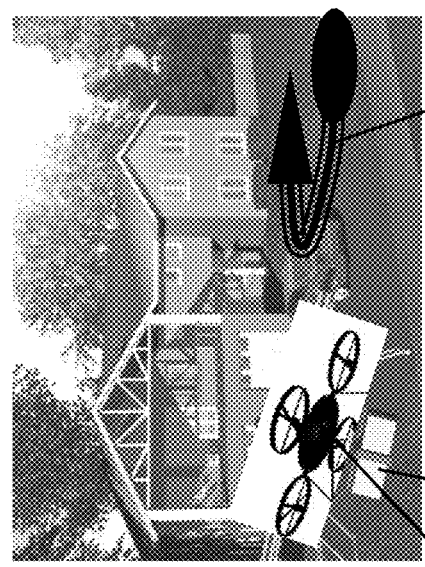

(51) Int. Cl.
  *B64C 39/02* (2006.01)
  *B64D 1/12* (2006.01)
  *B64F 1/00* (2006.01)
  *E05B 49/00* (2006.01)
  *G06Q 10/08* (2012.01)
  *A47G 29/14* (2006.01)
  *B60L 53/80* (2019.01)
  *B60L 53/60* (2019.01)

(52) U.S. Cl.
  CPC ............ *B60L 53/80* (2019.02); *B64C 39/024* (2013.01); *B64D 1/12* (2013.01); *B64F 1/005* (2013.01); *E05B 49/00* (2013.01); *G06Q 10/083* (2013.01); *A47G 2029/147* (2013.01); *B64C 2201/128* (2013.01)

(56) References Cited

U.S. PATENT DOCUMENTS

| | | | | |
|---|---|---|---|---|
| 5,867,099 A * | 2/1999 | Keeter | ................ | F21V 23/0442 340/565 |
| 6,426,699 B1 * | 7/2002 | Porter | .................... | A47F 10/00 221/2 |
| 6,448,407 B1 * | 9/2002 | Lee | ........................ | C07H 19/10 546/283.1 |
| 6,715,599 B1 * | 4/2004 | Fortenbery | ............ | B65G 47/44 198/360 |
| 6,960,750 B2 * | 11/2005 | Doane | ..................... | G02B 5/124 244/135 A |
| 7,320,427 B2 * | 1/2008 | Prestwich | .............. | A47G 29/16 232/45 |
| 8,511,606 B1 * | 8/2013 | Lutke | .................... | B64C 39/028 244/100 R |
| 9,056,676 B1 * | 6/2015 | Wang | ........................ | B64F 1/00 |
| 9,139,310 B1 * | 9/2015 | Wang | ........................ | B64F 1/36 |
| 9,244,147 B1 * | 1/2016 | Soundararajan | ........... | G01S 1/44 |
| 9,284,062 B2 * | 3/2016 | Wang | ........................ | B64F 1/20 |
| 9,290,277 B2 * | 3/2016 | You | ............................ | B64F 1/18 |
| 9,321,531 B1 * | 4/2016 | Takayama | ................ | B64D 1/12 |
| 9,387,928 B1 * | 7/2016 | Gentry | .................. | B64C 39/024 |
| 2014/0032034 A1 * | 1/2014 | Raptopoulos | ......... | G08G 5/0069 701/25 |
| 2014/0303814 A1 * | 10/2014 | Burema | ........................ | A01B 79/005 701/3 |
| 2015/0158599 A1 * | 6/2015 | Sisko | ........................ | B64F 1/32 244/114 R |
| 2015/0175276 A1 * | 6/2015 | Koster | ..................... | B64F 1/32 244/114 R |
| 2016/0196756 A1 * | 7/2016 | Prakash | ................. | B64C 39/024 701/3 |

* cited by examiner

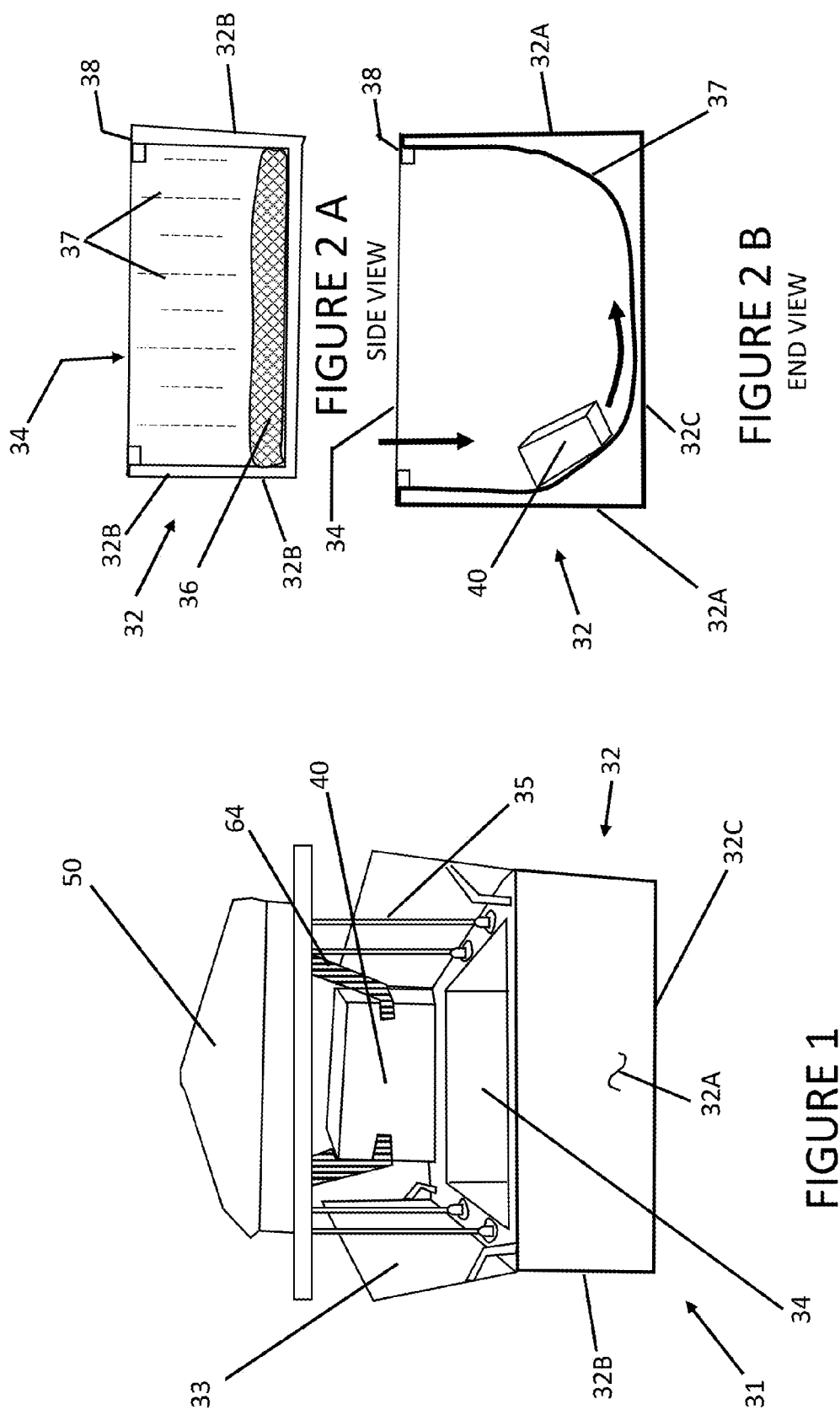

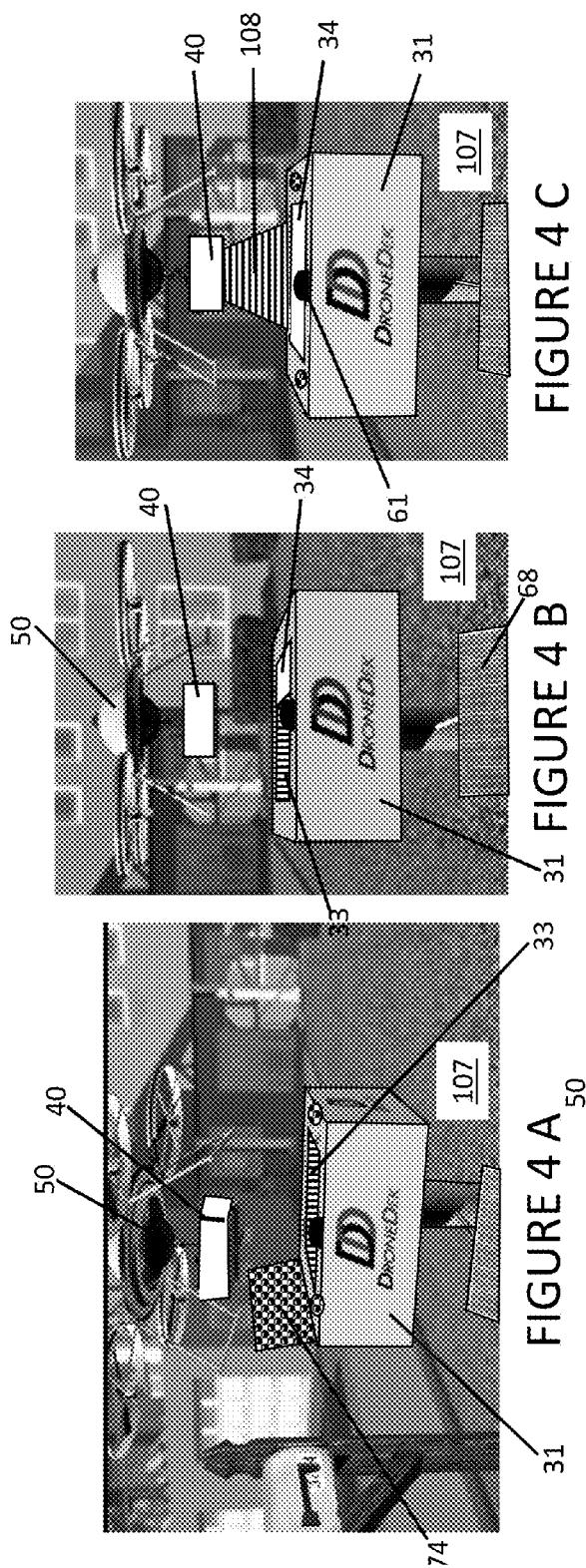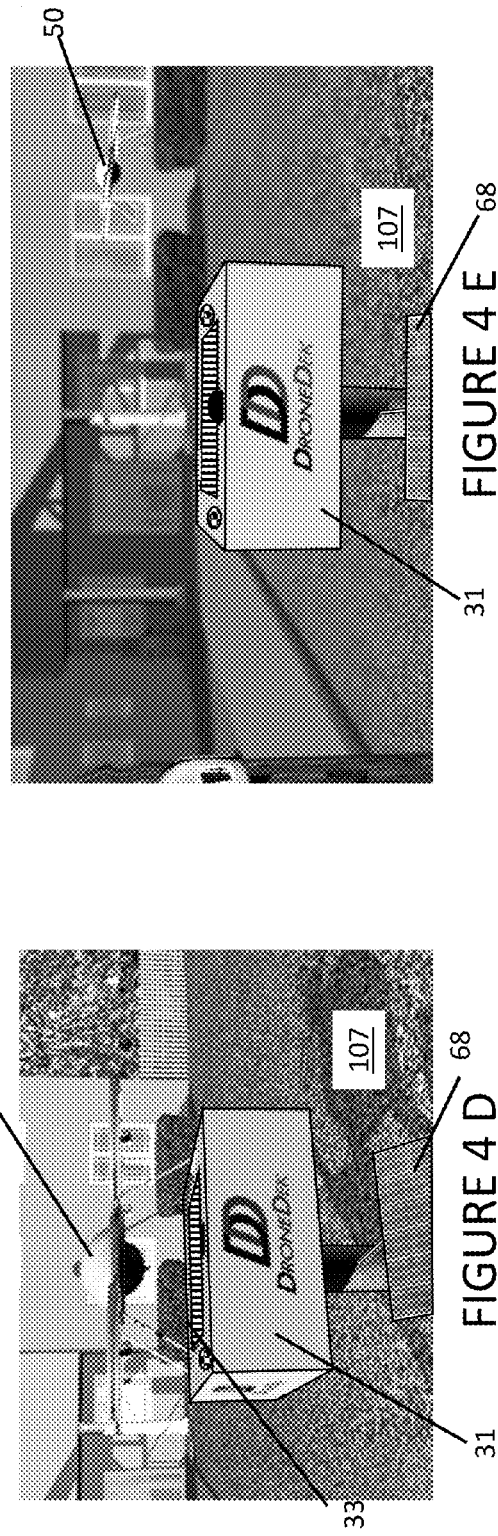
FIGURE 4 A
FIGURE 4 B
FIGURE 4 C
FIGURE 4 D
FIGURE 4 E

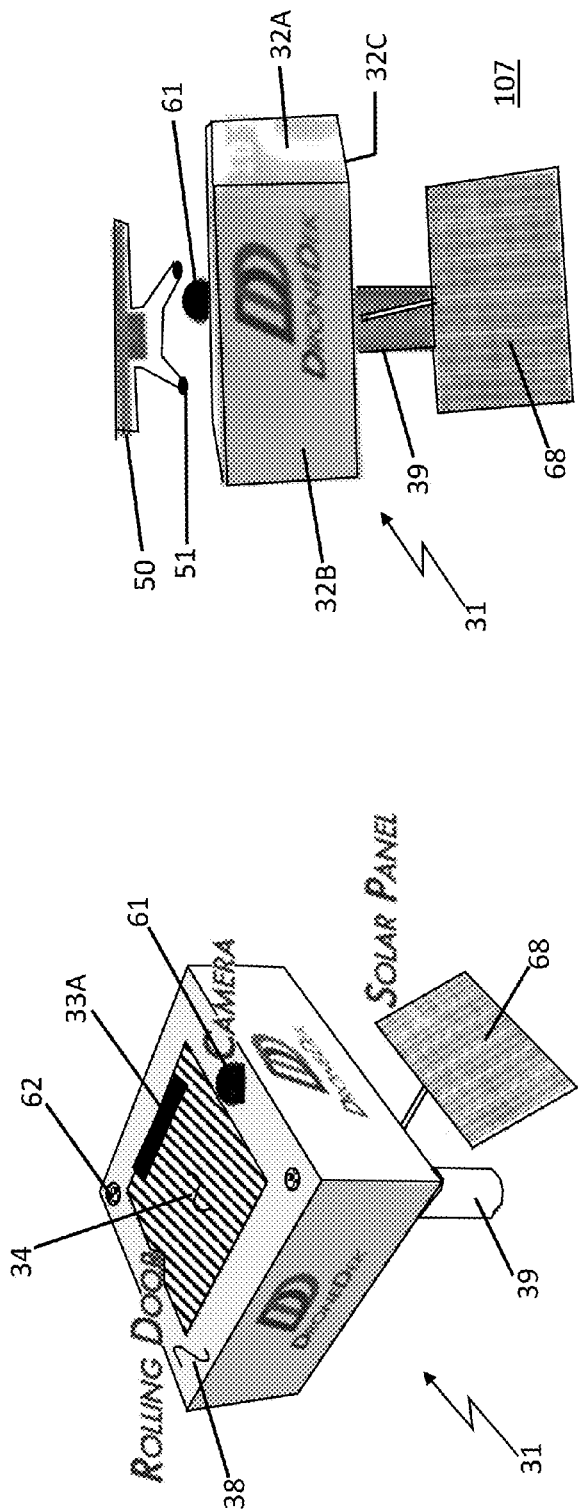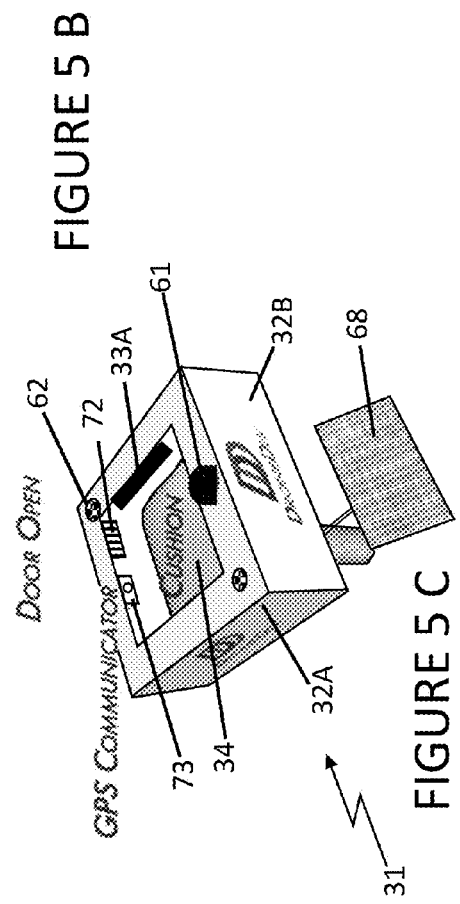

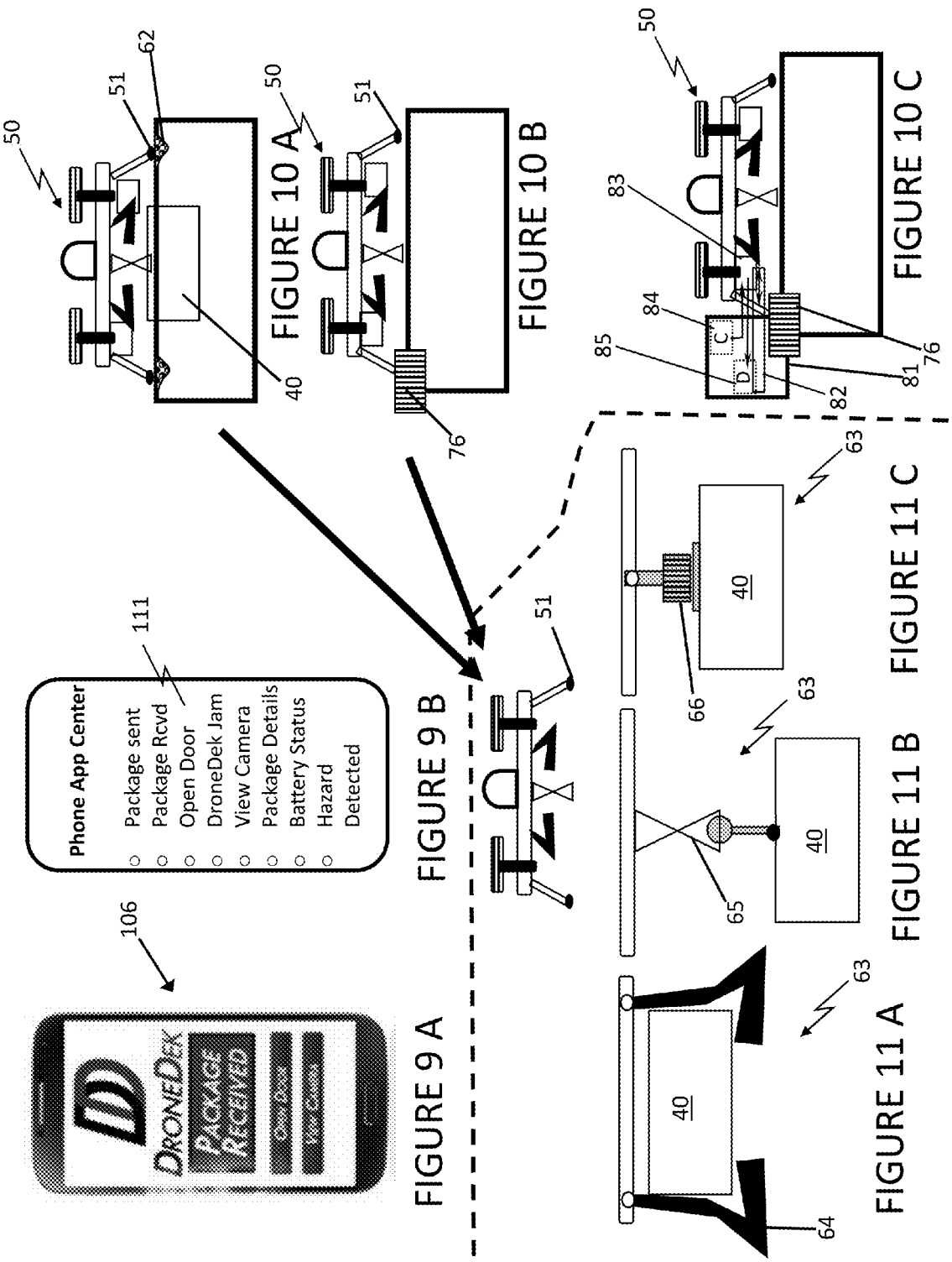

DRONE DOCKING STATION AND DELIVERY SYSTEM

CROSS-REFERENCE TO RELATED APPLICATIONS AND CONTINUITY

This application is a National application in the United States for PCT/US15/62034 filed Nov. 21, 2015 and entitled "DRONE DOCKING STATION AND DELIVERY SYSTEM". This application was also a Continuation-in-Part [C.I.P.] filed under 37 CFR 1.53(b) and claims the benefit of the original, non-provisional (Regular Utility) U.S. patent application Ser. No. 14/565,418 submitted Dec. 9, 2014 and as yet not published. The original application was still active on the date of the submission of this C.I.P. The original is entitled a "*Drone Docking Station and Delivery System*" and was submitted by Dan O'Toole. The original application is incorporated fully by reference as if it were reproduced here, verbatim.

FIELD OF INVENTION

The invention relates to drones and delivery of parcels or goods.

STATEMENT REGARDING FEDERALLY SPONSORED RESEARCH OR DEVELOPMENT

None.

SEQUENCE LISTING OR PROGRAM

None.

BACKGROUND—FIELD OF INVENTION AND PRIOR ART

A. Background

As drone delivery becomes ubiquitous, abundant and global the volume of unattended parcels dropped at businesses and residences will significantly increase. The high volume of parcels dropped will increase the exposure of theft, damage, etc. Thus there remains a need for a drone compatible secure delivery box that can reliably receive goods forma drone. The Drone Dock will save shippers significant amounts of money through the secure storage of delivered goods B. Prior Art As far as known there are no other devices or process that perform the function of the Drone Docking Station and Delivery System by Dan O'Toole. A U.S. published patent application US 20150183528 A1 by Walsh et al and entitled "Landing Pad for Unmanned Aerial Vehicle Delivery" teaches a landing pad that receives and stores packages delivered from an aerial vehicle are awaiting pickup from an aerial vehicle. The landing pad can be placed outside of a window and can contain a transmitter for sending out an identification signal via radio frequency to aid aerial vehicles in finding the landing pad. The landing pad contains a landing platform with a trapdoor that leads to a storage compartment. The trapdoor can be configured to only open when it receives a signal from an authorized aerial vehicle. The storage compartment can be accessed via a storage compartment door which can contain a locking mechanism. The storage compartment can be climate controlled. The landing pad can also have a transmitter that emits sounds to discourage animals from nesting on or near the landing pad. The landing pad can also include a solar power generator as a source of electrical energy. O'Toole in his device and system teaches many more features and improvements over Walsh as to the handling, security and communications with the drone pad.

Another U.S. published patent application US 20150158599 A1 by Sisko entitled "Robotic aerial vehicle delivery system and method" shows a delivery support system that accommodates and supports the delivery of packages, parcels and other items via an unmanned aerial vehicle. The system includes components to appropriately position a landing platform at a position and orientation that is away from general traffic areas and thus minimizes the potential for interaction with, and injury to individuals what may be in the area. The system further includes handling accommodations to cause delivered items to be transferred to a location readily accessible by an individual or person. The platform further includes systems to communicate with the unmanned aerial vehicle to aid in the delivery operations, and to confirm appropriate delivery of items. Again, this device does not anticipate or render obvious the O'Toole device and system that teaches many more features and improvements over Sisko as to the handling, security and communications with the drone pad.

Still another U.S. published patent application US 20150175276 A1 by Koster and entitled "Delivery platform for unmanned aerial vehicles" demonstrates an unmanned aerial vehicle (UAV) delivery apparatus is provided. The UAV delivery apparatus may include at least a pole and a landing platform. The pole of the present invention may have an extended length with a bottom end and a top end. The bottom end is securable to a surface to support the pole in an upright position. This published device again does not anticipate or render obvious the O'Toole device and system that teaches many more features and improvements over Koster as to the handling, security and communications with the drone pad. As far as known, there are no devices such as the present drone system and station device. It is believed that this DroneDek is unique in its design and technologies.

SUMMARY OF THE INVENTION

Disclosed herein is a system and device for a drone docking station for deposit of items delivered by drone. Items may include but not be limited to food items, groceries and parcels. A secure porch, roof, window or otherwise building mounted box may be secured through to an existing edifice or may be configured to mount to an existing mailbox post and actually take the place of the mailbox. In its preferred embodiment the drone parcel-receiving box may accommodate any item within size parameters that are drone-able. Typically a drone can carry a parcel the size of 2'×2' and weighing around 5 lbs, however the disclosure is not limited by any particular size delivery provided it can be carried by a drone. The drone dock may be made of either an abs plastic or steel construction or other suitable material.

The basic elements making of components of the box enable it to carry out one efficient and secure delivery of goods to a container box located at a specific address, and to securely hold those good until they are picked up regardless of duration, weather, or otherwise. The drone dock may employ many different technological devices in order to provide for communication between the drone dock and a drone, security, and preservation of the delivered goods before during and after delivery.

Objects and Advantages/Benefits

The Objects, Advantages and Benefits of the Drone Docking Station and Delivery System include, for example, but are not limited to:

Objects:
  A. To provide for communication between the drone dock and a drone
  B. To provide security, and preservation of the delivered goods before during and after delivery Advantages and Benefits:
The DroneDek system offers:
  1. Security
  2. Weather Proof
  3. GPS Location Enabled
  4. Charging Station
  5. Solar Powered
  6. Drop Off and Pick Up
  7. Flexible installation
  8. Connectivity
  9. Remote Access

BRIEF DESCRIPTION OF THE DRAWINGS FIGURES

The accompanying drawings, which are incorporated in and constitute a part of this specification, illustrate an embodiment of a Drone Docking Station and Delivery System that is preferred. The drawings together with the summary description given above and a detailed description given below serve to explain the principles of a Drone Docking Station and Delivery System. It is understood, however, that the DroneDeck is not limited to only the precise arrangements and instrumentalities shown.

FIG. 1 shows a general embodiment indicating some of the features of the invention herein. Shown is a drone interfacing with a delivery container.

FIG. 2 A shows one embodiment for container design which includes a padding element and FIG. 2 B shows one embodiment for container design which includes a sloped or curved interior surface to prevent parcel damage.

FIG. 3 and FIGS. 3 A through 3 C show the communication and delivery system from the order of the product/parcel to the delivery.

FIGS. 4 A through 4 E show the delivery by a drone at the residential or commercial receiving location.

FIGS. 5 A through 5 C show a general embodiment indicating some of the features of the DroneDek.

Figure 6:
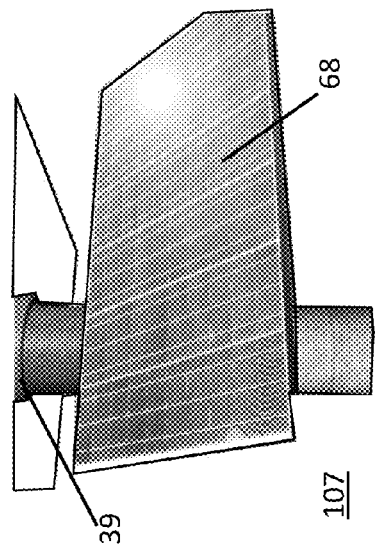
Figure 6:
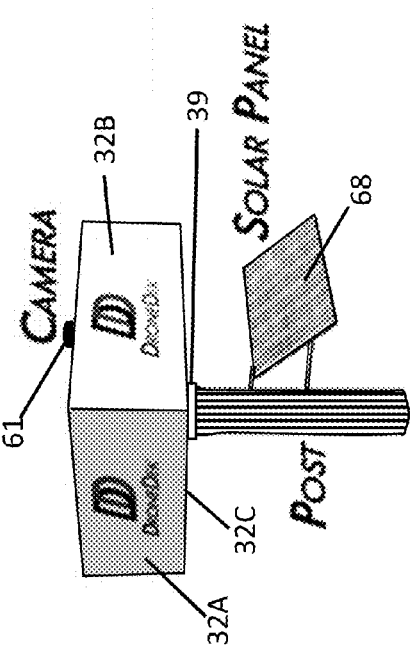
Figure 6:
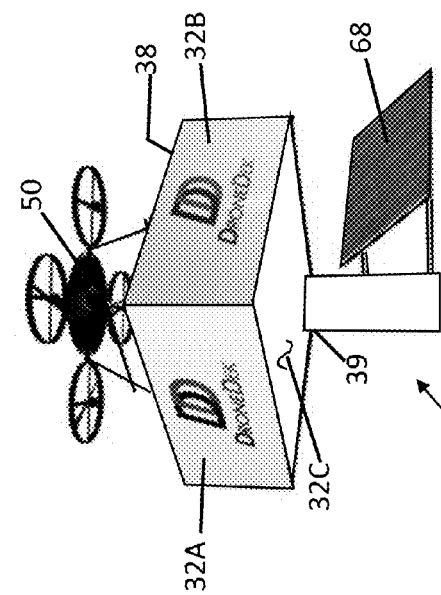
Figure 6:
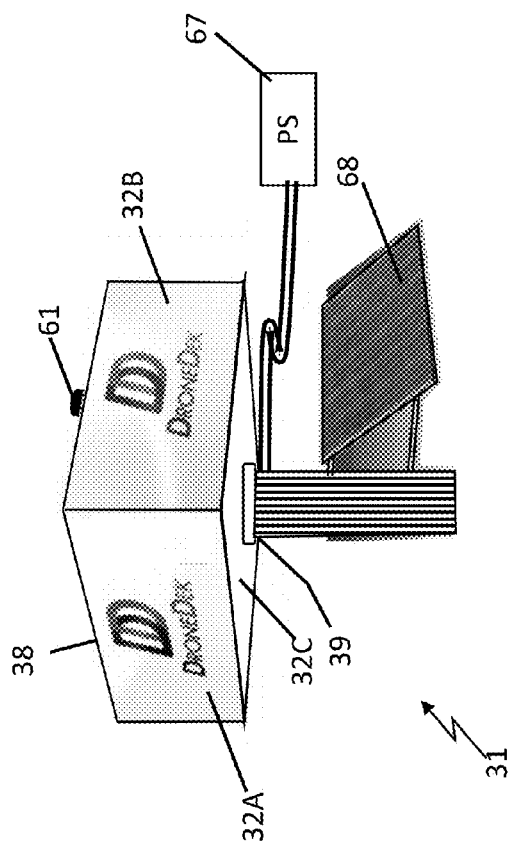

FIGS. 6 A through 6 D show a general embodiment of the DroneDek and indicating more of the additional features of the invention.

Figure 7:
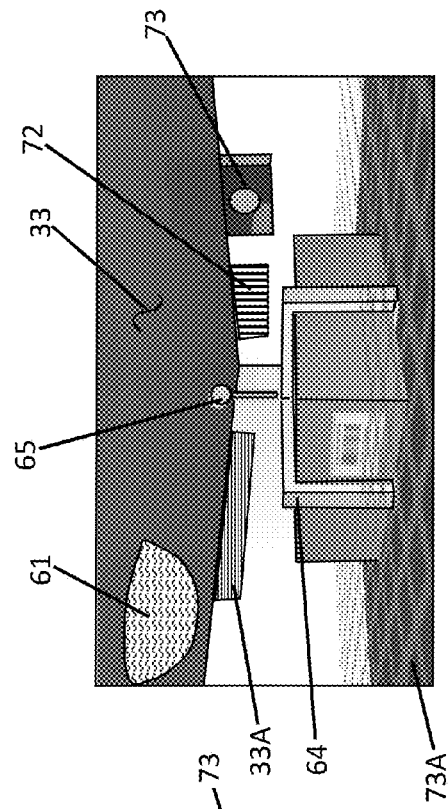
Figure 7:
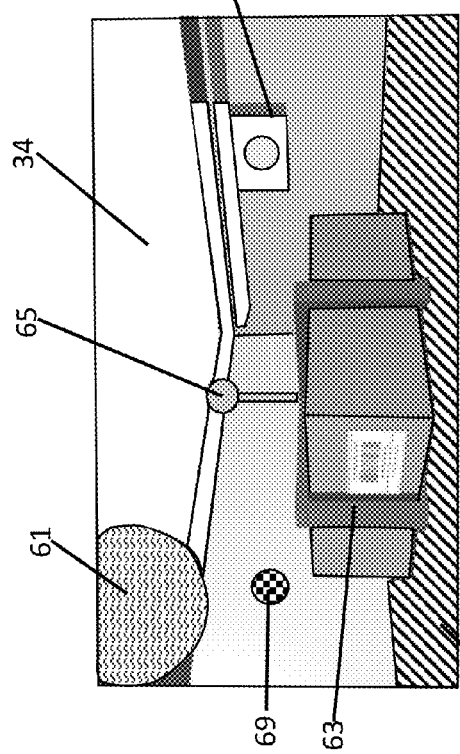
Figure 7:
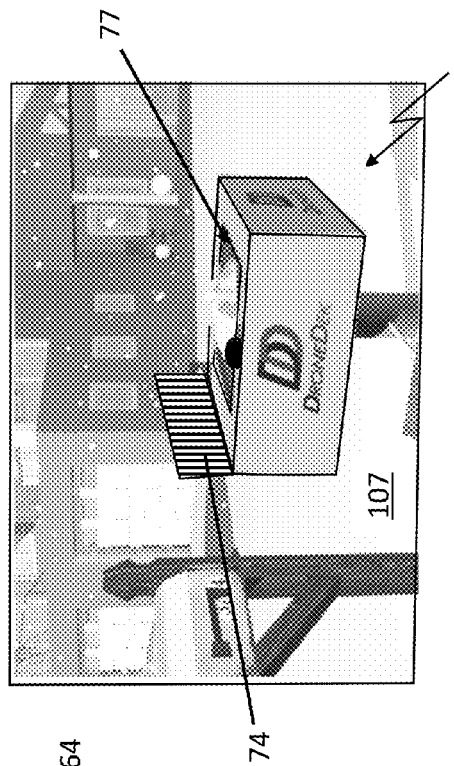
Figure 7:
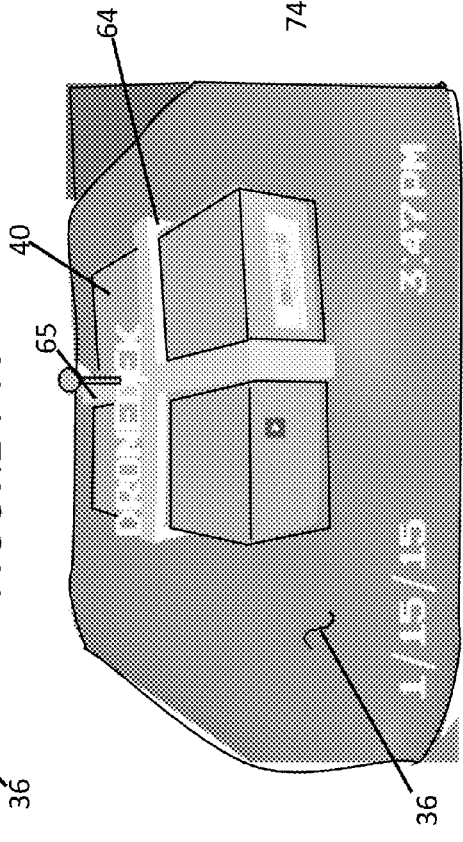

FIGS. 7 A through 7 D show a general embodiment indicating still more of the additional features of the DroneDek.

Figure 8:
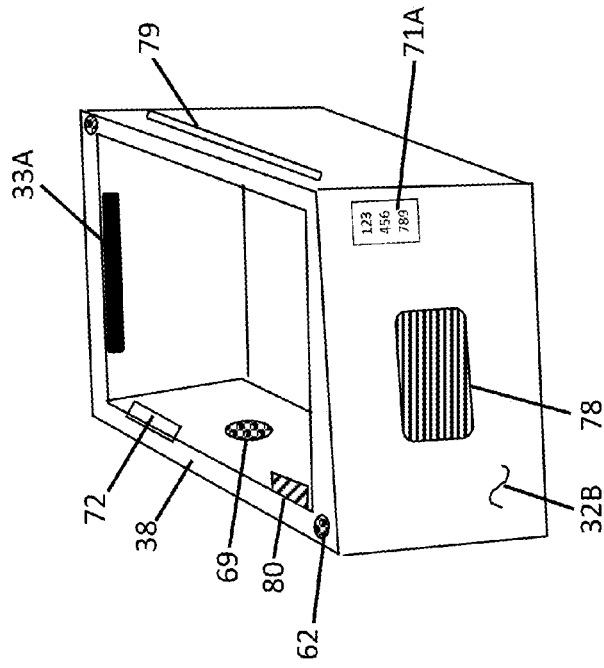
Figure 8:
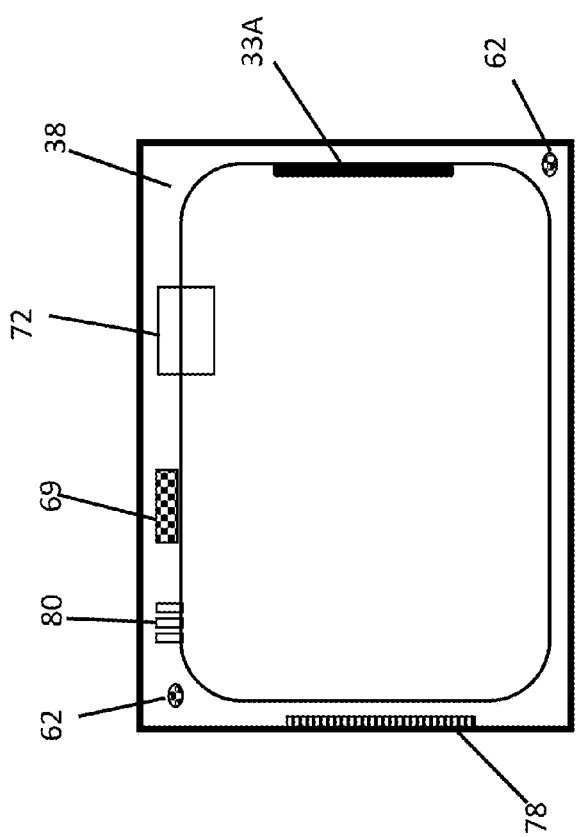
Figure 8:

FIGS. 8 A through 8 C show an embodiment indicating features of the DroneDek.

FIGS. 9 A and 9 B show a general embodiment indicating some of the communication features of the DroneDek.

FIGS. 10 A through 10 C show added options for a DroneDek.

FIGS. 11 A through 11 C show a general embodiment indicating some of the pick-up mechanisms of the DroneDek.

DESCRIPTION OF THE DRAWINGS—REFERENCE NUMERALS

The following list shows a reference number to the drawings:

| No. | Description |
|---|---|
| 30 | drone docking system 30 for deposit of items delivered by drone 50 |
| 31 | drone docking station 31 for deposit of items delivered by drone hereinafter referred to as drone dock, docking station, the box, or drone box or docking box) for deposit of items delivered by drone. |
| 32 | drone docking station structure 32 |
| 32A | side and side surface 32A of structure 32 |
| 32B | end and end surface 32B of structure 32 |
| 32C | bottom and bottom surface 32C of structure 32 |
| 33 | closeable and openable hinged or movable/motorized sliding doors 33 on the dock structure 32 |
| 33A | door motor 33A |
| 34 | drone structure/container opening 34 |
| 35 | mechanism or means 35 for drone 50 to releasably engage and disengage the structure 32 |
| 36 | foam or soft padding 36 |
| 37 | surface curvature 37 to slow parcel 40 acceptance into container 31 |
| 38 | top surface 38 of docking structure 32 surrounding the perimeter of the opening 33 |
| 39 | means for securing and mounting 39 docking station 31 at a selected location |
| 40 | parcels 40 such as food items, groceries, tools, electronics, documents, and the like |
| 50 | drone 50 |
| 50A | drone 50A with parcel |
| 50B | drone 50B empty/without parcel |
| 51 | drone pads 51 |
| 60 | other features 60 of station |
| 61 | camera system 61 internal/external to compartment of drone 50 |
| 62 | optional receiving dimples 62 for the drone pads 51 |
| 63 | a means of transferring 63 the contents/parcel 40 of the drone 50 to the interior of the box through the opening 34 and a mean of disengaging from the parcel 40 such as controllable arms 64; releasable/locking ball and socket with the package 65; magnetic or electronic holding structure 66 |
| 64 | controllable catch arms 64 or the like |
| 65 | releasable/locking ball and socket with the package 65 or the like |
| 66 | magnetic or electronic holding structure 66 or the like |
| 67 | power source 67 |
| 68 | solar panel 69 as a power source |
| 69 | one or more lighting mechanisms 69 inside the container 32 |
| 70 | a means of preserving and securely storing 70 the delivered goods once in the box - i.e. a total secure solution for home or office drone deliveries of parcels 40 |
| 71 | means for locking 71 |
| 71A | a keypad 71A for onsite access to the DroneDek |
| 72 | temperature control 72 |
| 73 | barcode reader 73 - infrared or other |
| 73A | barcode reader waves and signals 73A |
| 74 | wind block 74 |
| 75 | other structures 75 - |
| 76 | charging station 76 |
| 77 | heated top 77 |
| 78 | a motion flood light 78 |
| 79 | mail slot 79 for regular land mail |
| 80 | collector panel 80 for detection of explosives or anthrax or other perceived threats |
| 81 | battery exchange mechanism 81 for interchangeability of drone batteries with the DroneDek |
| 82 | extendable/retractable means for exchanging 82 batteries such as an extendable arm and securing latch to remove the drone battery 83, move it to the exchange mechanism 81 and move charged battery 84 back to drone 50 and re-engage the drone power connection |
| 83 | drone battery 83 |
| 84 | charged battery 84 |
| 85 | discharged battery 85 |
| 90 | parcel order mechanism 90 - personal communication devices 106 connected to the network 103 |
| 91 | providing system 91 - order, supplier and distribution company - "good stuff company". |
| 100 | location and communication with docking station 31 |
| 101 | mounting location 101 for station 31 |
| 102 | a means of locating 102 the docking station 31 such that drone can approach and dock with it. GPS system or the like, etc. |
| 103 | cloud/network 103 |
| 104 | satellites 104 |
| 105 | signal and cell towers 105 |
| 106 | personal communication devices 106 - such as smart phones, tablets, laptops, personal computers and the like |
| 107 | specific GPS address 107 for the docking station 31 |

-continued

| No. | Description |
|---|---|
| 108 | local signal/or mechanical means - frustrum or the like 108 - to facilitate final location and transfer |
| 109 | Signal 109 from the docking station 31 |
| 110 | a means for communication 110 between the drone and the drone dock, either directly or through a remote server |
| 111 | smart phone application or the like to communicate status of the docking event with the user of the personal communication devices 106 |
| 112 | Flight 112 from Goods source 91 to docking station 31 |
| 113 | Flight 113 from docking station 31 back to good source or other user destination |
| 114 | Alternative flight 114 from original docking station to secondary docking station to "pick-up" parcel |

DETAILED DESCRIPTION OF THE PREFERRED EMBODIMENTS

The present invention relates to drones and delivery of parcels or goods. There are shown in FIGS. 1-11 a description of the Drone Docking Station 31 and Delivery System 30 called a DroneDek. Disclosed herein is a system and device for a drone docking station (hereinafter referred to as drone dock, the box, or drone box or docking box) for deposit of items delivered by drone. Items may include but not be limited to food items, groceries and parcels. A secure porch, roof, window or otherwise building mounted box may be secured through hardware such as that which may be due example anchored into wood, concrete or masonry and the any material used in the construction of residential or commercial structures. The box also can be configured to mount to an existing mailbox post and actually take the place of the mailbox.

The accompanying drawings, which are incorporated in and constitute a part of this specification, illustrate a preferred embodiment and examples of uses. The preferred embodiment comprises several elements and means and should include the basic elements making of components of the DroneDek box enable it to carry out one or more the following functions: a means of locating the box such that drone can approach and dock with it; a means of engaging the box such that a stable connection or attachment can be made; a means of transferring the contents of the drone to the interior of the box; a means of preserving and securely storing the delivered goods once in the box; a mean of disengaging from the box; a means of communication between the drone and the drone dock, either directly or through a remote server; one or more functional components incorporated within the box to allow for preservation and security of the stored goods, and to prevent damage during the transfer and or subsequent storage; and a means of securing the box to a structure located at a residential or commercial address. The DroneDek in its various embodiments may further incorporate one or more of the features shown in the following paragraphs in any combination, combining to deliver a total secure solution for home or office drone deliveries.

The details mentioned here are exemplary and not limiting. Other specific components and manners specific to describing the Drone Docking Station and Delivery System 30 may be added as a person having ordinary skill in the field of drone systems including their docking, communication and operation.

FIG. 1 shows a general embodiment indicating some of the features of the invention herein. Shown is a drone interfacing with a delivery container. In FIG. 1, there is shown a drone 50; a parcel 40 being delivered by the drone 50 into the opening 34 of a delivery box/drone docking station 32; closeable and openable hinged or movable/motorized sliding doors 33 on the dock structure 32 that may open upon engagement of the drone 50 in this particular embodiment; one type of mechanism 35, for example, by which the drone 50 may engage the docking station 31 and communicate information, transfer energy, register magnetic engagement, or otherwise as disclosed herein this specification; a set of controllable catch arms 64 or the like; and the delivery container 32 separate features of a side and side surface 32A of structure 32, end and end surface 32B of structure 32, and bottom and bottom surface 32C of structure 32. One skilled in the art of drone systems and devices notes the figure shows one exemplary embodiment, and does not limit the text of the disclosure herein. One notes that the drone dock can be made of either an abs plastic, steel construction, composite material or other suitable material including but not limited to woods, plastics, ceramics, metals, rubber or other polymers and synthetic materials. It could be offered in different sizes to allow for high volume customers that receive multiple parcels in a given time period. One also notes that the item/parcel 40 will drop in and the lids will return to their home position and not allow for access to the inserted item except by the intended recipient. One also notes that the means 35 mechanism or means for drone 50 to releasably engage and disengage the structure 32 (structure top surface 38 and optional drone support pad receiving dimples 62) comprises a platform opening 34, top surface 38, cover 33, local signal/mechanical 73, camera system 61 plus optional drone pads 51 receiving dimples 62. Further one notes that a typical parcel is approximately sized 2 feet by 2 feet by 12 inches—5 pounds, however one skilled in the art appreciates that there may be no limit to size as drone carrying capacity increases. The system disclosure is not limited by any particular size delivery provided it can be carried by a drone.

FIG. 2 A shows one embodiment for container design which includes a padding element and FIG. 2 B shows one embodiment for container design which includes a sloped or curved interior surface to prevent parcel damage. In FIG. 2 A, is shown general drone docking station structure 32 for the drone docking station 31; ends 32B of structure 32; the curvature 37 of the interior of the container box; a top surface 38 of docking structure 32 surrounding the perimeter of the opening 33; and a foam or other padding device 36 in order to cushion the bottom 32C of the structure 32 for when parcels 40 are dropped into it by a drone 50. FIG. 2 B indicates the curvature 37 of the interior of the container box 32, which may be utilized to slow parcel 40 and in order to prevent and abrupt landing of delivered items/parcels 40 when dropped into a box; the sides 32A and bottom 32C of the structure 32. In embodiments with this feature a parcel may gently slide to a halt.

FIG. 3 and FIGS. 3 A through 3 C show the communication and delivery system from the order of the product/parcel 40 to the delivery to the consumer location 101—residential or commercial. FIG. 3 shows a drone docking system 30 for deposit of items delivered by drone 50; drone docking station 31 for deposit of items delivered by drone hereinafter referred to as drone dock, docking station, the box, or drone box or docking box) for deposit of items delivered by drone; drone 50; drone 50A with parcel; drone 50B empty/without parcel; parcel order mechanism 90—personal communication devices 106 connected to the network 103; providing system 91—order, supplier and distribution company—"good stuff company"; location and communication 100 with docking station 31; a means of locating 102 the docking station 31 such that drone can approach and dock with it. GPS system or the like, etc.; a cloud/network 103; satellites 104; signal and cell towers 105 personal communication devices 106—such as smart phones, tablets, laptops, personal computers and the like; a specific GPS address 107 for the docking station 31; local signal/or mechanical means—frustrum or the like 108—to facilitate final location and transfer; a signal 109 from the docking station 31; a means for communication 110 between the drone 50 and the drone dock 31, either directly or through a remote server; a flight 112 from Goods source 91 to docking station 31 flight 113 from docking station 31 back to good source or other user destination; an alternative flight 114 from original docking station to secondary docking station to "pick-up" parcel. FIGS. 3 A through 3 C show drone docking system 30 for deposit of items delivered by drone 50; parcels 40 such as food items, groceries, tools, electronics, documents, and the like; drone 50; providing system 91—order, supplier and distribution company— "good stuff company"; a means of locating 102 the docking station 31 such that drone can approach and dock with it. GPS system or the like, etc.; and a specific GPS address 107 for the docking station 31. One notes that the mounting location 101 for station 31 is such as a secure porch, roof, window or otherwise building structure where a mounted box may be secured through to an existing open edifice or may be configured to mount to an existing mailbox post. This must be accessible from a hovering type drone permit take offs. Likewise, the means 102 comprises the docking station 31 such that drone can approach and dock with it. GPS system or the like, etc. Docking station 31 to be located at a residential or commercial address and the drone dock may have a number of tracking functionalities. The Drone Dock with its self-contained power supply in certain embodiments can broadcast the GPS coordinates to its owner in the event it is taken from its base location and from landings into an open airspace for approach, landing, takeoff and departure.

One notes that communication between the drone 50 and the drone dock 31 may be through electronic or magnetic connection that is made upon the drone landing and connecting with the box. The communication may also be turn over a wireless network such as Wi-Fi, Bluetooth satellite etc. and others that would be recognized by those skilled in the art. In alternative embodiments a remote server may be employed whereby the drone communicates its location and docking details to the remote server, upon which the remote server pings or otherwise delivers and signal directly to the box or an associated IP address triggering it to unlock and open. The box 31 may also communicate via RFID in order to identity itself to the drone (or vice versa) and communicate a bar code or I.D. sequence required for docking and unlocking. In similar fashion a Bluetooth signal may be employed to communicate a code to the drone once the drone is in range of the box and its blue tooth signal. In certain embodiments the box 31 will deliver GPS guidance to the drone 50 for proper docking and delivery into box. A Two (2) stage—close and dead-on—blue gps and frustrum 108—the Drone Dock 31 will then report to its owner/communication device 106 and the shipper and the shipping company 91 that the parcel 40 is securely in the docking station 31 and the owner 106 may come and retrieve it 40. The drone dock 31 may also report charging status of the drone 50 as well as takeoff status to shipper 91.

FIGS. 4 A through 4 E show the delivery by a drone 50 at the residential or commercial receiving location 101. Here are shown drone docking station 31 for deposit of items delivered by drone hereinafter referred to as drone dock, docking station, the box, or drone box or docking box) for deposit of items delivered by drone; closeable and openable hinged or movable/motorized sliding doors 33 on the dock structure 32; drone structure/container opening 34; parcels 40 such as food items, groceries, tools, electronics, documents, and the like; drone 50; solar panel 68 as a power source; wind block 74; specific GPS address 107 for the docking station 31; and local signal/or mechanical means—a frustrum or the like 108—to facilitate final location and transfer. Other structures 75 anticipate and can be employed to provide for easier and more accurate engagement of the drone with the drone dock such as extended platforms, slides, funnels, and other type structures that would enable a two phased docking approach. Such structures 75 would first allow for contact between the drone 50 and extended drone dock structure, and facilitate a guided placement into the proper docking position.

FIGS. 5 A through 5 C show a general embodiment indicating some of the unique features of the DroneDek 31. Shown here are the drone docking station 31 for deposit of items delivered by drone hereinafter referred to as drone dock, docking station, the box, or drone box or docking box) for deposit of items delivered by drone; drone docking station structure 32 including a side and side surface 32A of structure 32, end and end surface 32B of structure 32, and bottom and bottom surface 32C of structure 32; a closeable and openable hinged or movable/motorized sliding doors 33 on the dock structure 32; a door motor 33A; a drone structure/container opening 34; a mechanism or means 35 for drone 50 to releasably engage and disengage the structure 32; a foam or soft padding 36; a top surface 38 of docking structure 32 surrounding the perimeter of the opening 33; a means for securing and mounting 39 docking station 31 at a selected location; the drone 50; drone pads 51; a camera system 61 internal/external to compartment of drone 50; optional receiving dimples 62 for the drone pads 51; a solar panel 68 as a power source 67; temperature control 72; a barcode reader 73—infrared or other; and a specific GPS address 107 for the docking station 31. The camera system 61 is anticipated as comprising a mounted security camera 61 may employ in alternative embodiments other such security devices including alarms, motion detectors, and the like. The power source maybe through connection to an electronic outlet, onboard battery power, wind power, or powered by connections for solar panels on the station 31. The preferred embodiment will feature a solar panel 68 that will provide the power needed by the unit for all of its features. The unit is also available with a 110 v. power supply for easy access to standard power supplies. A means of preserving and securely storing the delivered goods once in the box—i.e. a totally secure solution for home or office drone deliveries. This solution includes lock system 71, temperature control 72, curved access sides 37 and soft floor or bottom 36. One or more functional components incorporated within the box to allow for preservation and security of the stored goods, and to prevent damage during the transfer and or subsequent storage. The temperature control 72—the drone dock may be temperature controlled to ensure proper storage of the delivered goods. This may include both heating and cooling functions depending upon the season and the nature of the delivered goods. The box may additionally have separate compartments for receiving goods that specifically should be heated, cooled, or kept at room temperature range in any season.

FIGS. 6 A through 6 D show a general embodiment of the DroneDek 30 and indicating more of the additional features of the invention. Shown here are the drone docking station 31 for deposit of items delivered by drone hereinafter referred to as drone dock, docking station, the box, or drone box or docking box) for deposit of items delivered by drone; drone docking station structure 32 including a side and side surface 32A of structure 32, end and end surface 32B of structure 32, and bottom and bottom surface 32C of structure 32; a closeable and openable hinged or movable/motorized sliding doors 33 on the dock structure 32; a top surface 38 of docking structure 32 surrounding the perimeter of the opening 33; a means for securing and mounting 39 docking station 31 at a selected location; the drone 50; a camera system 61 internal/external to compartment of drone 50; a solar panel 68 as a power source; and a specific GPS address 107 for the docking station 31. The means for securing 39 comprises and anticipates that a building mounted box may be secured through hardware such as that which may be due example anchored into wood, concrete or masonry and the any material used in the construction of residential or commercial structures. A means of securing the box to a structure located at a residential or commercial address closeable, locking box with limited access.

FIGS. 7 A through 7 D show a general embodiment indicating still more of the additional features of the DroneDek 30. Demonstrated here include the drone docking station 31 for deposit of items delivered by drone hereinafter referred to as drone dock, docking station, the box, or drone box or docking box) for deposit of items delivered by drone; a closeable and openable hinged or movable/motorized sliding doors 33 on the dock structure 32; a door motor 33A; a drone structure/container opening 34; a foam or soft padding 36; parcels 40 such as food items, groceries, tools, electronics, documents, and the like; camera system 61 internal/external to compartment of drone 50; a means of transferring 63 the contents/parcel 40 of the drone 50 to the interior of the box through the opening 34; a mean of disengaging from the parcel 40 such as controllable arms 64; releasable/locking ball and socket with the package 65; one or more lighting mechanisms 69 inside the container 32; temperature control 72; barcode reader 73—infrared or other; barcode reader waves and signals 73A; a wind block 74; a heated top 77—The Drone Dock may feature a heated top to insure that the access area is always operational in cold temperatures, and prevent the collection of snow or ice that may inhibit its function; and a specific GPS address 107 for the docking station 31.

FIGS. 8 A through 8 C show an embodiment indicating features of the DroneDek 30,31. Here are shown several views and optional elements. The DroneDek system 30 can comprise drone docking station structure 32 including a side and side surface 32A of structure 32, end and end surface 32B of structure 32; a top surface 38 of docking structure 32 surrounding the perimeter of the opening 33; an optional receiving dimples 62 for the drone pads 51; one or more lighting mechanisms 69 inside the container 32; means for locking 71 a keypad 71A for onsite access to the DroneDek; temperature control 72; a motion flood light 78; mail slot 79 for regular land mail; and a collector panel 80 for detection of explosives or anthrax or other perceived threats. The means for locking 71 comprising one or more devices connected to the container enabling a recipient of the delivered goods to unlock the container through an entered code, a key, or through unlocking via a mobile electronic device software application.

FIGS. 9 A and 9 B show a general embodiment indicating some of the communication features of the DroneDek system 30. Here are shown the personal communication devices 106—such as smart phones, tablets, laptops, personal computers and the like and the smart phone application 111 or the like to communicate status of the docking event with the user of the personal communication devices 106.

FIGS. 10 A and 10 B show added options for a DroneDek system 30. Here the various elements shown are: parcels 40 such as food items, groceries, tools, electronics, documents, and the like; a drone 50; drone pads 51; receiving dimples 62; and a charging station 76. FIG. 10C demonstrates a battery exchange mechanism 81 with an extendable/retractable means for exchanging 82 batteries such as an extendable arm and securing latch to remove the drone battery 83, move it to the exchange mechanism 81 and move charged battery 84 back to drone 50 and re-engage the drone power connection. Also shown are the drone battery 83, charged battery 84, and discharged battery 85. This feature permits battery pack interchangeability. The premise is that all or some dronedeks will have a "ready-to-go" fully charged battery pack that a commercial drone or other may identify from the virtual grid. Said drone may be directed to a DroneDek whereby the Dronedek will facilitate with the swap of the drones dead battery to the fully charged battery available from the dronedek. Battery life is a huge consideration and a huge impediment on the commercial drone market. Access to such a fully charged battery in so many assorted locations throughout the infrastructure of the country is a huge advantage and creates commercial market place value for the interchangeability option. Drones may have and use fully charged batteries. This exchange program would be available to all commercial drones through a subscription service program.

FIGS. 11 A through 11 C show a general embodiment indicating some of the pick-up mechanisms of the DroneDek 30. Here are shown examples and not limitations to engage parcels 40 by the drone for deposit in the DroneDek 31. Shown are a means of transferring 63 the contents/parcel 40 of the drone 50 to the interior of the box through the opening 34 and a means of disengaging from the parcel 40 such as controllable arms 64; releasable/locking ball and socket with the package 65; magnetic or electronic holding structure 66 or the like.

The details mentioned here are exemplary and not limiting. Other specific components and manners specific to describing a Drone Docking Station and Delivery System 31 may be added as a person having ordinary skill in the field of drone systems and platform devices and their uses well appreciates.

Operation of the Embodiments

The Drone Docking Station and Delivery System 30 and have been described in the above embodiment. The manner of how these devices operate is described below. One notes well that the description above and the operation described here must be taken together to fully illustrate the concept of the Drone Docking Station and Delivery System 30.

A secure code that drone accesses to direct the dock to open its top to allow for safe delivery into the box may be employed. In lieu of code drone may trigger opening of drone dock by simply accessing its landing base. Communication between the drone and the drone dock may be through electronic or magnetic connection that is made upon the drone landing and connecting with the box. The communication may be directly between the docking or delivery box and the drone itself upon docking in order to facilitate the transmission of a code in a lock box. In alternative embodiments a remote server may be employed whereby the drone communicates its location and docking details to the remote server, upon which the remote server pings or otherwise delivers and signal directly to the box or an associated IP address triggering it to unlock and open. The box may also communicate via RFID in order to identity itself to the drone (or vice versa) and communicate a bar code or I.D. sequence required for docking and unlocking. In similar fashion a Bluetooth signal may be employed to communicate a code to the drone once the drone is in range of the box and its blue tooth signal. In certain embodiments the box will deliver GPS guidance to the drone for proper docking and delivery into box. Upon successful deposit in the dock, the top will close securely assuring that entry into the dock by vandals, thieves or animals is prohibited. Retrigger to close may be accomplished in similar fashion to the signal to open either by direct communication between the drawing and the box or through a remote server. The box may also be designed to automatically close and lock once the drone un-docks from the box. And the communication may also be turn over a wireless network such as Wi-Fi, Bluetooth satellite etc. and others that would be recognized by those skilled in the art. The communication may be directly between the docking or delivery box and the drone itself upon docking in order to facilitate the transmission of a code in a lock box. In alternative embodiments a remote server may be employed whereby the drone communicates its location and docking details to the remote server, upon which the remote server pings or otherwise delivers and signal directly to the box or an associated IP address triggering it to unlock and open. The box may also communicate via RFID in order to identity itself to the drone (or vice versa) and communicate a bar code or I.D. sequence required for docking and unlocking. In similar fashion a Bluetooth signal may be employed to communicate a code to the drone once the drone is in range of the box and its blue tooth signal. In certain embodiments the box will deliver GPS guidance to the drone for proper docking and delivery into box. Upon successful deposit in the dock, the top will close securely assuring that entry into the dock by vandals, thieves or animals is prohibited. Retrigger to close may be accomplished in similar fashion to the signal to open either by direct communication between the drawing and the box or through a remote server. The box may also be designed to automatically close and lock once the drone un-docks from the box.

The box design may allow a drop of the item into its pressure sensitive lids. The item will drop in and the lids will return to their home position and not allow for access to the inserted item except by the intended recipient. The Drone Dock will then report to its owner and the shipper and the shipping company that the item is securely in the dock and come and retrieve it. The drone dock may also report charging status as well as takeoff status to shipper.

The objects, advantages and benefits include, but are not limited to:
Objects: 1. To provide for communication between the drone dock and a drone, and 2. To provide security, and preservation of the delivered goods before during and after delivery Advantages and benefits include:

| | |
|---|---|
| Security | Has a secure opening and closing door feature that allows the drone to communicate with the station and open and close its cargo doors to receive and ship its contents. |
| Weather Proof | Protects packages from rain, wind, sleet, hail and snow, and also harsh temperatures. A heated cargo door option allows for access during the iciest of weather. |
| GPS Location Enabled | Allows through a GPS beacon for the shipping drone to hone in on the DroneDek's precise location. |
| Charging Station | Features a built-in charging station that is capable of re-energizing the drone, effectively doubling drone delivery range. |
| Solar Powered | Is powered by a solar panel and/or 110-volt electrical power supply, allowing for operation of its high level features. |
| Drop Off and Pick Up | Is a secure receptacle designed to hold parcels that are received or that are waiting to be shipped. |
| Flexible installation | Has a secure mounting infrastructure for iron-clad installation to a structure, post, or concrete flat work. |
| Connectivity | Allows the user to easily stay connected to his/her package. Dronedek features a contents-sensing switch that via its app, can communicate successful receipt and shipping of parcels to shipper, recipient, and/or shipping company. A user can even see the package via DroneDek's built-in camera. |
| Remote Access | Features a secure mobile application allowing for remote camera access and the ability to lock and unlock your DroneDek via ones phone or tablet. The owner of the box may retrieve the contents easily through a simple code entered, key or cell phone app. |

The phrase "in one embodiment" is used repeatedly. The phrase generally does not refer to the same embodiment; however, it may. The terms "comprising," "having" and "including" are synonymous, unless the context dictates otherwise. The following illustrations of various embodiments use particular terms by way of example to describe the various embodiments, but this should be construed to encompass and provide for terms such as "method" and "routine" and the like.

Various aspects of the illustrative embodiments will be described using terms commonly employed by those skilled in the art to convey the substance of their work to others skilled in the art. However, it will be apparent to those skilled in the art that the embodiments described herein may be practiced with only some of the described aspects. For purposes of explanation, specific numbers, materials and configurations are set forth in order to provide a thorough understanding of the illustrative embodiments. However, it will be apparent to one skilled in the art that the embodiments described herein may be practiced without the specific details. In other instances, well-known features are omitted or simplified in order not to obscure the illustrative embodiments.

The characteristics and utilities of the present invention described in this summary and the detailed description below are not all inclusive. Many additional features and advantages will be apparent to one of ordinary skill in the art given the following description. There has thus been outlined, rather broadly, the more important features of the invention in order that the detailed description thereof that follows may be better understood, and in order that the present contribution to the art may be better appreciated.

In this respect, by explaining at least one embodiment of the invention in detail, it is to be understood that the invention is not limited in its application to the details of construction and to the arrangements of the components set forth in the description. The invention is capable of other

The invention claimed is:

1. A drone docking station device comprising:
   A container with a motorized sliding door for accepting deliveries of a group of food items, groceries and/or parcels (e.g. goods); and
      The container mounted to a building, house, post, porch, roof, window or existing mailbox;
   A device mounted on the container for communicating with a drone
   A letter slot allowing for one way deposits of mail;
   A flood light energized by a motion detector for enhanced area security; and
   A solar panel mounted on the docking station
   Wherein the container is mounted for ready access by persons to a building, house, post, porch, roof, window and/or existing mailbox.

2. The docking station of claim 1 further comprising:
   An engagement signal wave of the drone with the drone docking station triggering the transmission of a code unlocking the container;
   Wherein communication between the drone and the docking station is wireless either directly or through a remote server; and
   Wherein the wireless communication may be Bluetooth, Wi-Fi, satellite, or through an RFID mechanism.

3. The drone docking station of claim 2 further comprising a solar panel.

4. The docking station of claim 1 further comprising:
   The container including a device capable of communicating GPS information to the drone to facilitate docking with said container.

5. The docking station of claim 1 further comprising wherein disengagement of the drone from the docking station triggers the container to securely close.

6. The docking station of claim 1 further comprising a curved bottom in the interior of the container to mitigate the abruptness of dropping an item from the group of food items into the container.

7. The docking station of claim 1 further comprising a soft material in the bottom of the interior of the container to mitigate the abruptness of dropping an item from the group of food items into the container.

8. The docking station of claim 1 wherein the container is temperature controlled.

9. The docking station of claim 1, wherein the docking station includes a power source, said power source being any of a connection to an electronic outlet, onboard battery power, and/or wind power.

10. The docking station of claim 9, further comprising charging the drone's power source while it is connected to the docking station.

11. The docking station of claim 10, wherein the drone or the drone docking station sends information on any of charging status, takeoff status, or delivery status to one or more parties.

12. The docking station of claim 1, wherein delivery of items from the drone into the container triggers a signal to one or more parties that the items have been delivered.

13. The docking station of claim 1, wherein the docking station container has a heated top.

14. The docking station of claim 1 further comprising a mounted security camera.

15. The docking station of claim 1, wherein the docking station is mounted to a surface by hardware capable of anchoring into wood, concrete, metal, or masonry.

16. The docking station of claim 1 further comprising structures enabling a two phased docking approach, said phases being a first phase comprising an initial contact between the drone and the docking station, and a second phase of guiding a drone into a final landing position on the docking station.

17. The docking station of claim 1 further comprising one or more devices connected to the container enabling a recipient of the delivered goods to unlock the container through an entered code, a key, a keypad or through unlocking via a mobile electronic device software application.

18. The drone docking station device of claim 1 further comprising a battery exchange mechanism to provide means for interchanging drone batteries and exchanging a discharged battery with a charged battery.

19. The drone docking station of claim 1 further comprising a wind block.

20. The drone docking station of claim 1 further comprising a collector panel (80) for detection of explosives, anthrax, and other perceived threats.

21. A drone docking station for accepting deliveries of goods from a drone comprising:
   a means of locating the drone docking station such that the drone may accurately approach and dock with the drone docking station;
   a means of engaging the drone docking station such that a stable connection or attachment can be made to the drone;
   a means of transferring the goods of the drone to the interior of the drone docking station;
   a means of preserving and securely storing the delivered goods contents once in the interior of the drone docking station;
   a mean of disengaging the drone from the drone docking station;
   a means of communication between the drone and the drone docking station;
   At least one functional component incorporated within the interior of the drone docking station to allow for preservation and security of the stored goods and to prevent damage during the transfer and subsequent storage;
   a means of securing the drone docking station to a structure post mount located at a residential or commercial address;
   a letter slot allowing for one way deposits of mail;
   a motion flood light for enhanced area security; and
   a solar panel mounted on the docking station.

* * * * *